United States Patent [19]

Klinedinst

[11] 4,272,593
[45] Jun. 9, 1981

[54] ELECTROCHEMICAL CELL WITH IMPROVED CATHODE CURRENT COLLECTOR

[75] Inventor: Keith A. Klinedinst, Marlborough, Mass.

[73] Assignee: GTE Laboratories Incorporated, Waltham, Mass.

[21] Appl. No.: 143,697

[22] Filed: Apr. 25, 1980

[51] Int. Cl.³ .................................................. H01M 4/36
[52] U.S. Cl. ...................................... 429/101; 429/196
[58] Field of Search ......................... 429/101, 194, 196

[56] References Cited

U.S. PATENT DOCUMENTS

| | | | |
|---|---|---|---|
| 3,857,737 | 12/1974 | Kemp et al. | 136/120 FC |
| 3,926,669 | 12/1975 | Auborn | 429/196 |
| 4,012,564 | 3/1977 | Auborn | 429/196 X |
| 4,159,367 | 6/1979 | Berchielli et al. | 429/101 X |
| 4,167,608 | 9/1979 | Giattino | 429/101 X |
| 4,170,693 | 10/1979 | Cotanzarite | 429/101 X |
| 4,177,329 | 12/1979 | Dey et al. | 429/101 |
| 4,219,443 | 8/1980 | Klinedinst | 429/196 X |

OTHER PUBLICATIONS

"The Reduction of Sulfuryl Chloride at Teflon-Bonded Carbon Cathodes," Electrochem. Soc., Los Angeles, Cal. Oct. 14–19, 1979, Gilman & Wode.

*Primary Examiner*—Charles F. LeFevour
*Attorney, Agent, or Firm*—David M. Keay

[57] ABSTRACT

A primary electrochemical cell having an oxidizable active anode material, a cathode current collector including a catalytic layer for reducing the liquid cathode material, and an electrolytic solution comprising a liquid cathode material and an electrolyte solute dissolved therein. The catalyst layer is a composite material of carbon black particles with platinum particles supported thereon.

11 Claims, 10 Drawing Figures

ELECTROCHEMICAL CELL WITH IMPROVED CATHODE CURRENT COLLECTOR

BACKGROUND OF THE INVENTION

This invention relates to primary electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of these cells is usually lithium or other highly electropositive metal. During discharge, the solvent is electrochemically reduced on a cathode current collector to yield ions, e.g. halogen ions, which react with metallic ions from the anode to form soluble metal salts, e.g. metal halides. The cathode current collector does not take part in the reaction itself, but simply provides a support on which the reaction can occur, supplying electrons given up during the oxidation of the anode material.

A wide variety of materials have been employed to make up the cathode current collector or to provide a catalytically active surface thereof. For example, various cathode current collectors are described in U.S. Pat. Nos. 3,926,669 and 4,012,564 to Auborn. An improved cathode current collector and methods of making it are described in U.S. patent application Ser. No. 971,571 filed Dec. 20, 1978, by Keith A. Klinedinst and Francis G. Murphy now U.S. Pat. No. 4,219,443 issued Aug. 26, 1980 and assigned to the assignee of the present application. This application describes a cathode current collector having a surface layer of a finely divided catalyst for reducing the liquid cathode consisting of gold, platinum, or carbon black. Cathode current collectors employing a surface layer of platinum black to provide a catalytic surface have been found to provide very high discharge rates and current densities. However, electrochemical cells employing cathode current collectors with catalytic surface layers of platinum black are very expensive because of the cost of platinum and, therefore, uneconomical for many applications.

SUMMARY OF THE INVENTION

It is an object of the present invention to provide a primary electrochemical cell with an improved cathode current collector.

It is a more specific object of the present invention to provide a primary electrochemical cell with an improved cathode current collector which enables high discharge rates and high current densities at low cost.

These and other objects are accomplished in primary electrochemical cells in accordance with the present invention comprising an oxidizable active anode material, a cathode current collector including a catalyst for reducing the liquid cathode material which comprises a composite material of carbon and platinum bonded to an inert, electrically-conductive substrate, and an electrolytic solution, in contact with the anode material and cathode current collector, which comprises a reducible liquid cathode material and an electrolyte solute dissolved therein. The catalytically active composite material employs a relatively small amount of platinum made possible by dispersing platinum particles upon carbon particles so as to achieve a high surface-to-volume ratio. Thus, the cost of the resulting composite material is a fraction of that of pure platinum.

For a better understanding of the present invention, together with other and further objects, advantages, and capabilities thereof, reference is made to the following discussion and appended claims in connection with the above described drawing.

DETAILED DESCRIPTION OF THE INVENTION

In the following specification and claims when an electrochemical cell is designated as having a particular anode or cathode material, that anode or cathode, or anode or cathode material, means the electrochemically active component, and not the non-consumable electrically conducting, inert or catalytic cathode current collector or anode current collector. Such an electrode may be in contact with, or form a part of, a suitable substrate, in the case of the anode or will be a fluid in the case of the cathode. The catalyst materials defined herein are active only in the sense that they actively catalyze the reduction of the liquid cathode. The catalysts are not themselves reduced under the desired cell operating conditions.

The improved cathode current collector of the present invention includes a catalyst which comprises a composite material of carbon and platinum. The composite material is composed of submicron-size particles of metallic platinum supported upon the surfaces of carbon black particles. By the use of a relatively small amount of platinum, preferably between 5 and 30% by weight as a practical matter, which is made possible by dispersing the platinum particles upon the surface of the carbon particles so as to achieve a high surface-to-volume ratio, the cost of the resulting catalyst is only a fraction of that of a catalyst of pure platinum black as described in the above-mentioned application of Klinedinst and Murphy.

Figure 1:
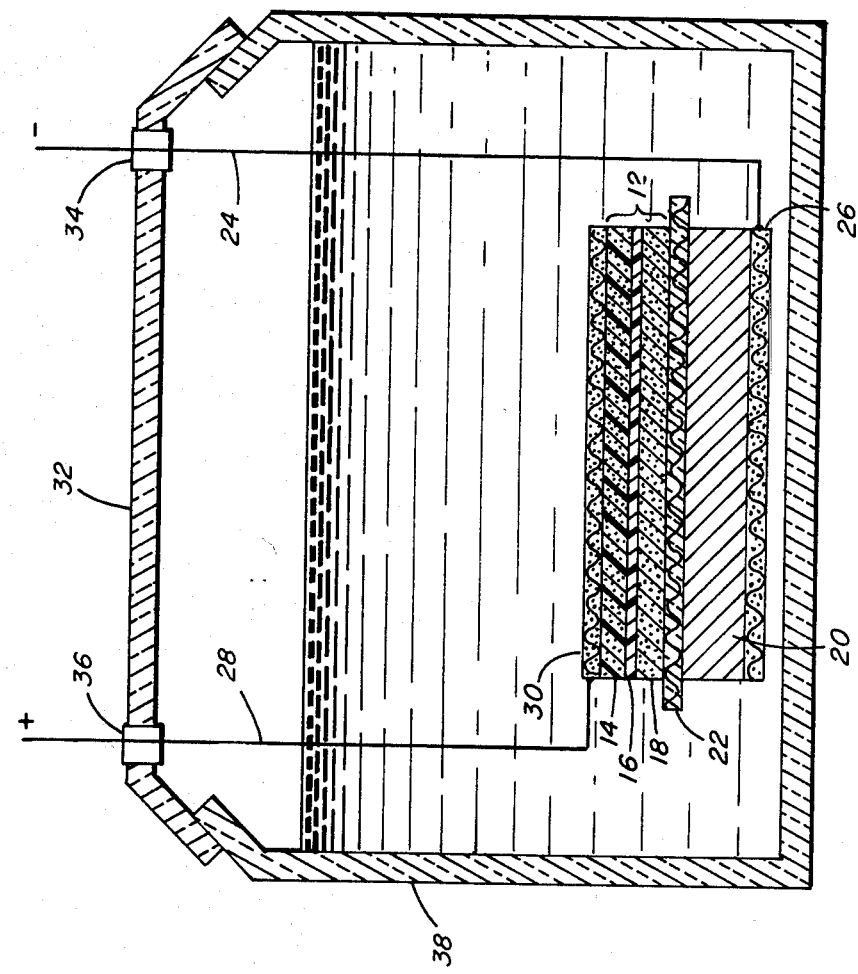
FIG. 1 is a schematic representation in cross section of a primary electrochemical cell employing a cathode current collector in accordance with the present invention.

FIG. 1 is a schematic illustration of an electrochemical cell in accordance with the present invention. The cathode current collector, generally designated 12, is made up of three layers 14, 16 and 18. Layer 14 is an inert, electrically-conductive substrate, layer 16 is a bonding layer, and layer 18 is a catalyst layer comprising a layer of carbon black particles with platinum particles dispersed upon the carbon black particles providing a catalyst surface for reducing the liquid cathode. The cathode current collector 12 is preferably separated from the oxidizable anode 20 by a porous separators 22. The anode is electrically connected to a lead wire 24 by a current collector 26. In a similar manner cathode current collector 12 may be electrically connected to a lead wire 28 by a member 30, if required. The lead wires 24 and 28 pass through the cell cover 32 by way of seals 34 and 36. The cell cover 32 is in close sealing engagement with the main container 38. The interior of the cell container 38 is filled with an electrolytic solution 42 which comprises a fluid, reducible soluble cathode material and an electrolyte solute dissolved therein.

The electrically conductive substrate 14 of the cathode current collector 12 may be any of various known materials which are electrically conductive and inert in the presence of the materials employed in the cell. Representative substrate materials are nickel, nickel alloys, and stainless steel. In the particular embodiment under discussion the substrate is a thin foil of nickel.

The catalyst layer 18 is preferably bonded to the substrate 14 by means of an intermediate bonding layer 16. The catalyst layer 18 is a composite material of carbon and platinum. More specifically, the layer is an aggregate of carbon black particles with platinum particles supported upon each of the carbon black particles. The composite material can be made by any of a variety of procedures all of which basically involve saturating carbon black with a solution of a platinum-containing compound followed by the evaporation of the solvent and the thermal decomposition of the platinum-containing compound in an oxidizing or reducing medium. Techniques of preparing such composite materials are discussed in "Preparation and Characterization of Highly Dispersed Electrocatalytic Materials" by K. Kinoshita and P. Stonehart in *Modern Aspects of Electrochemistry*, No. 12, edited by J. O'M. Bockris and B. E. Conway, Plenum Press, New York, 1977, pp. 183–266. The catalyst layer 18 also includes a small amount of a finely-divided thermoplastic polymer as a binder mixed with the carbon-platinum composite. The thermoplastic polymer may be any polymeric bonding material which is inert in the cell and which passes through a thermoplastic state, whether or not it finally sets or cures. The preferred material is polytetrafluoroethylene (PTFE).

When a bonding layer 16 is employed, as is preferred, it is applied to the substrate 14 prior to the application of the catalyst layer 18. The bonding layer comprises a finely-divided thermoplastic polymer, and an inert, electrically-conductive material. Preferably the thermoplastic polymer may be PTFE and the inert electrically conductive material carbon black to provide a porous bonding layer 16 which adheres to the substrate 14 and to which the catalyst layer 18 readily adheres.

The anode 20 is an oxidizable material and is preferably lithium metal. The electrolytic solution 42 comprises a reducible liquid cathode solvent and an electrolyte solute dissolved therein. In the present specific embodiments the solvent is thionyl chloride. An electrolyte solute is dissolved in the solvent in order to raise its conductivity. In the specific embodiments under discussion the solute is lithium tetrachloroaluminate. A thorough discussion of various useful anode materials, cathode solvents, and electrolyte solutes is provided in the above-mentioned application of Klinedinst and Murphy which is incorporated herein by reference.

The following examples are for the purpose of further illustrating and explaining the present invention, and are not to be taken as limiting the scope thereof. In all of the following examples the cathode current collector employed a nickel foil substrate 0.005 inch thick which was roughened with emery paper, cleaned, and dried. The active catalyst material was a composite of platinum supported on carbon particles as described hereinabove mixed with 10% by weight finely-divided PTFE. The carbon black was Shawinigan acetylene black (50% compressed) and the PTFE was DuPont TFE-30.

The prepared nickel foil substrate 14 was first coated with a binding layer 16 of PTFE and carbon black which served to bond the catalytically active layer 18 to the nickel substrate. The PTFE was DuPont TFE-30 and the carbon black was Cabot Corp. Vulcan XC-72. To mix the materials, 0.583 g of PTFE and 0.250 g of carbon black were dispersed ultrasonically in 250 cm$^3$ of distilled water using 20 drops of a 1% Triton X-100 solution as a surfactant. The bonding layer was built up upon the roughened surface of the nickel foil by alternately spraying the 70% PTFE-30% carbon black aqueous dispersion and drying in accordance with the spraying technique described in detail in the above-mentioned application of Klinedinst and Murphy. The bonding material was alternately sprayed on and dried until the layer was 10 μm thick. The nickel foil-bonding layer combination was heated in air for about 15 minutes at a temperature of about 345° C.

In fabricating the active catalyst layer 18 for each example, 1.00 g of the carbon black-platinum composite and enough DuPont TFE-30 to provide 0.11 g dry weight of PTFE were dispersed ultrasonically in 500 cm$^3$ of distilled water using 40 drops of a 1% Triton X-100 solution as a surfactant. The active catalyst layer 18 was built up to a thickness of 50 μm on the surface of the bonding layer 16 by alternately spraying the 90% carbon black-platinum composite-10% PTFE aqueous dispersion and then drying in accordance with the spraying technique described in the aforementioned application of Klinedinst and Murphy. The combination of the nickel foil substrate 14, bonding layer 16, and active catalyst layer 18 was heated in air for about 15 minutes at a temperature of about 345° C.

In the test procedures followed in each of the examples a 1 cm$^2$ piece was cut from the cathode current collector and tested in a cell as shown schematically in FIG. 1. The anode 20 was 0.030 inch lithium and the separator 22 was a porous glass separator 0.005 inch thick. The electrolyte was 1.5 M lithium tetrachloroaluminate (LiAlCl$_4$) dissolved in the thionyl chloride (SOCl$_2$) liquid cathode solvent. The anode substrate 26 and the lead wires 34 and 36 were of nickel. The cells were discharged across constant loads such that the average discharge current density was between about 0.6 and about 250 mA per cm² of the cathode current collector surface area. The cell voltage was recorded as a function of time using an electronic recording voltmeter. Cells in accordance with the present invention as described above and in further detail below for each example were compared with cells which were identical except that the layer 18 was made from carbon black rather than the carbon black-platinum composite of the present invention.

EXAMPLE I

Figure 2:
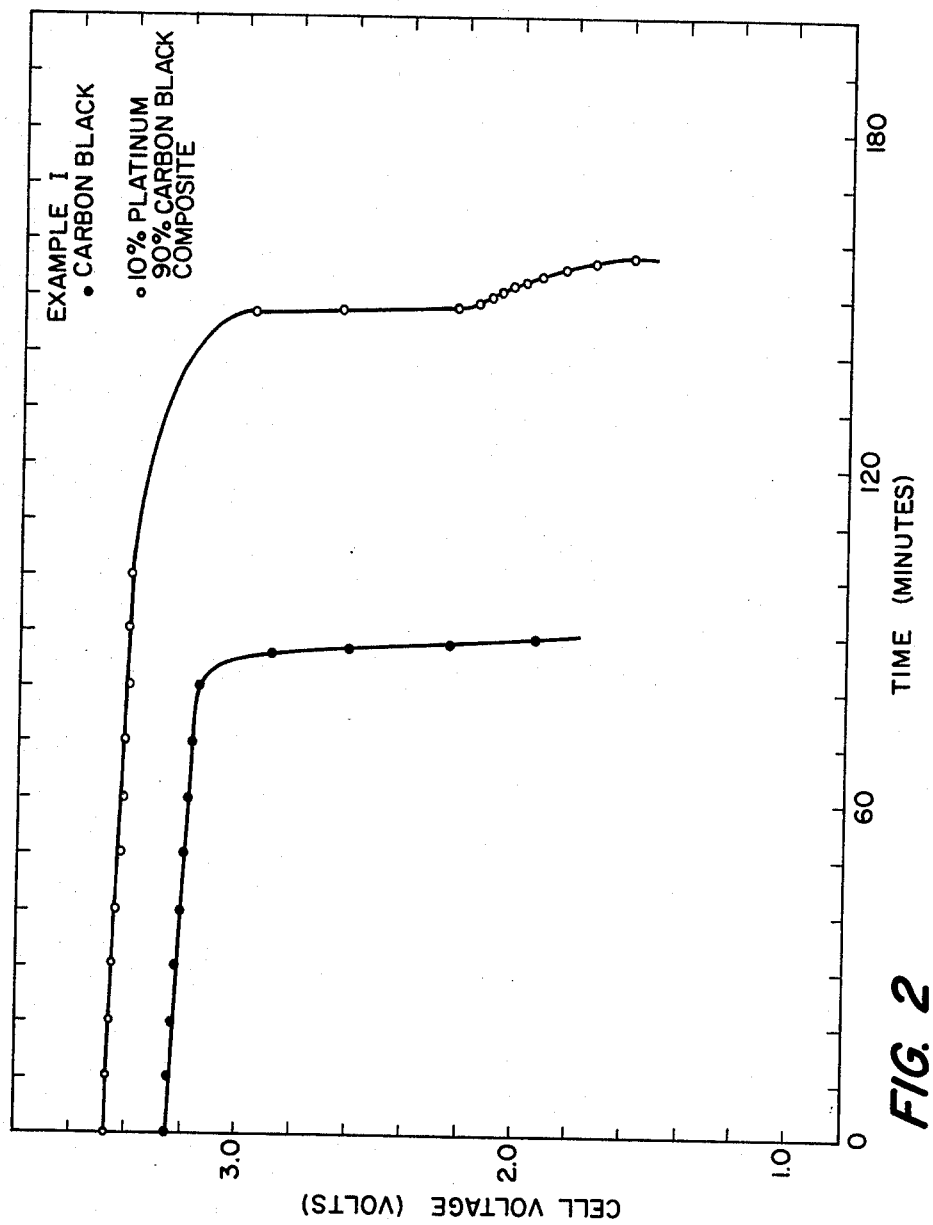
FIG. 2 is a graph showing the discharge curves for cells prepared according to Example I.

A cathode current collector in accordance with the invention employing an active catalyst layer of a composite containing 10% by weight platinum and 90% by weight carbon black was fabricated as above. The average diameter of the supported platinum crystallites was about 30 Å. A cell employing the cathode current collector as described was discharged across a constant load of 1,000 ohms and a similar cell employing a cathode current collector with a layer of carbon black was similarly tested. The resulting discharge curves of cell voltage versus time on load are shown in FIG. 2. As shown by the curves the cell containing the carbon black-platinum composite material discharged at a higher voltage and for a longer time than the cell employing the carbon black. The average discharge voltage of the cell with carbon black was 3.16 volts and that of the cell with the carbon black-platinum composite was 3.42 volts. The discharge capacity of the cell with carbon black was 4.57 mAh/cm² and that of the cell with the carbon black-platinum composite was 9.55 mAh/cm². Thus, the use of a 10% platinum composite provided a cell voltage on load increase of about 250 millivolts and the discharge capacity more than doubled.

Figure 3:
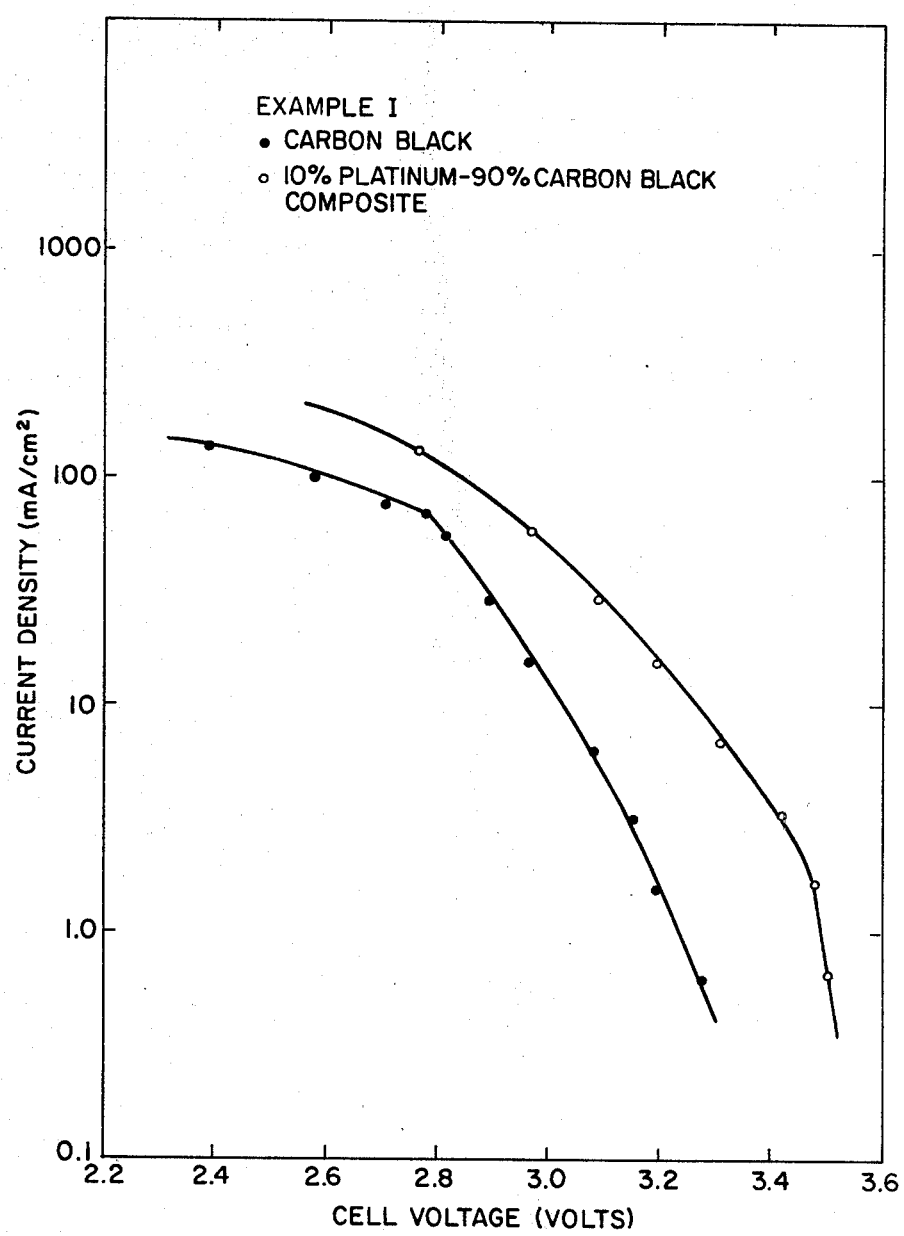
FIG. 3 is a graph showing the curves of cell voltage versus current density for cells prepared according to Example I.

Other lithium-thionyl chloride cells containing carbon black-platinum composite material as described in this example and other sample cells containing carbon black cathodes were discharged across a series of constant loads so that the average current density ranged from about 0.6 to about 140 mA/cm². The resulting discharge curves were then analyzed to provide the plots of the average cell voltage versus the logarithm of the average current density as shown in the curves of FIG. 3. As can be seen from the curves of FIG. 3 over the entire range of discharge rates cells containing the carbon black-platinum composite discharged at voltages which were between 200 and 300 millivolts higher than the cells employing carbon black.

Figure 4:
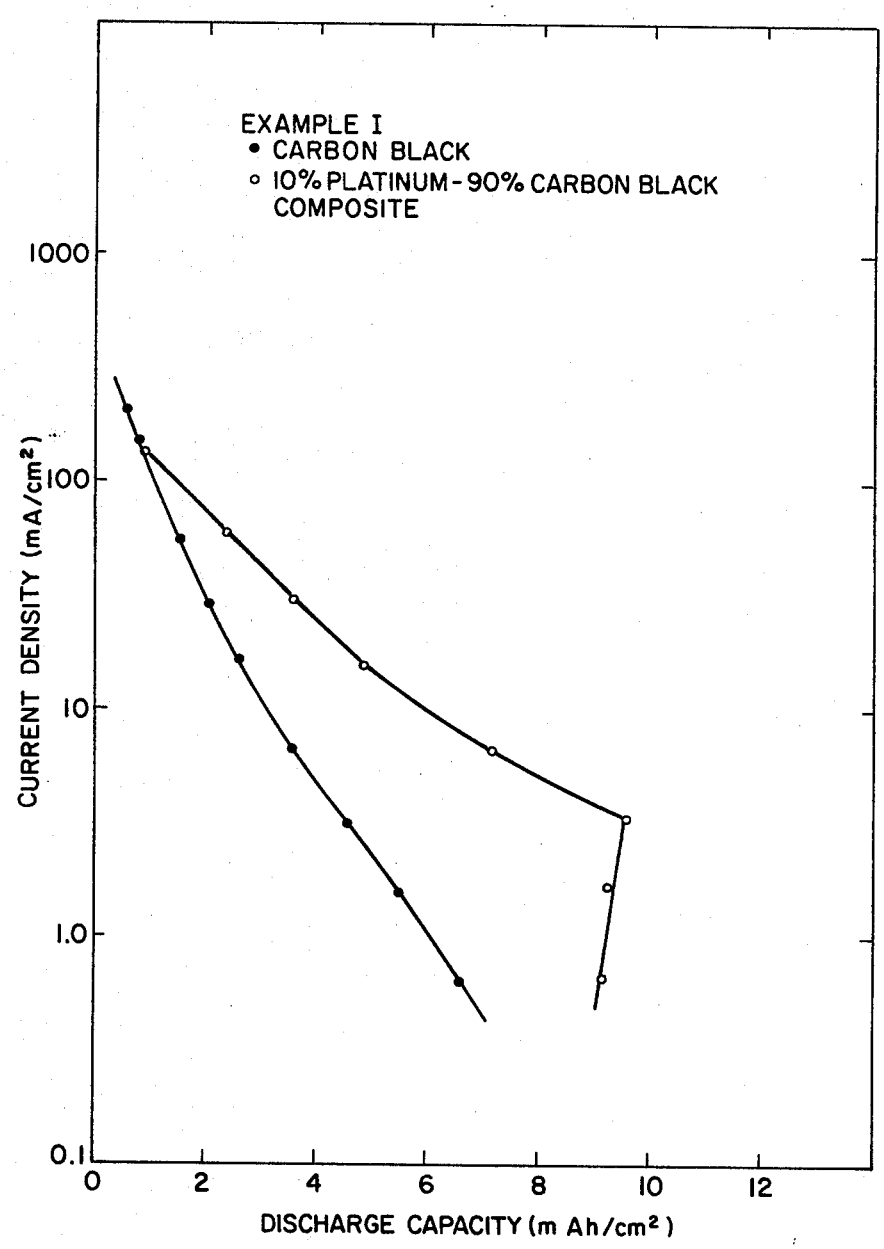
FIG. 4 is a graph showing the curves of discharge capacity versus current density for cells prepared according to Example I.

The discharge capacities derived from the same two groups of cells are plotted in FIG. 4 also as a function of the logarithm of the average current density. As can be seen from the curves of FIG. 4 for discharge rates between about 1 and about 60 mA/cm² cells containing the carbon black-platinum composite discharged from 1½ to 2 times as long as did the cells containing carbon black.

EXAMPLE II

Figure 5:
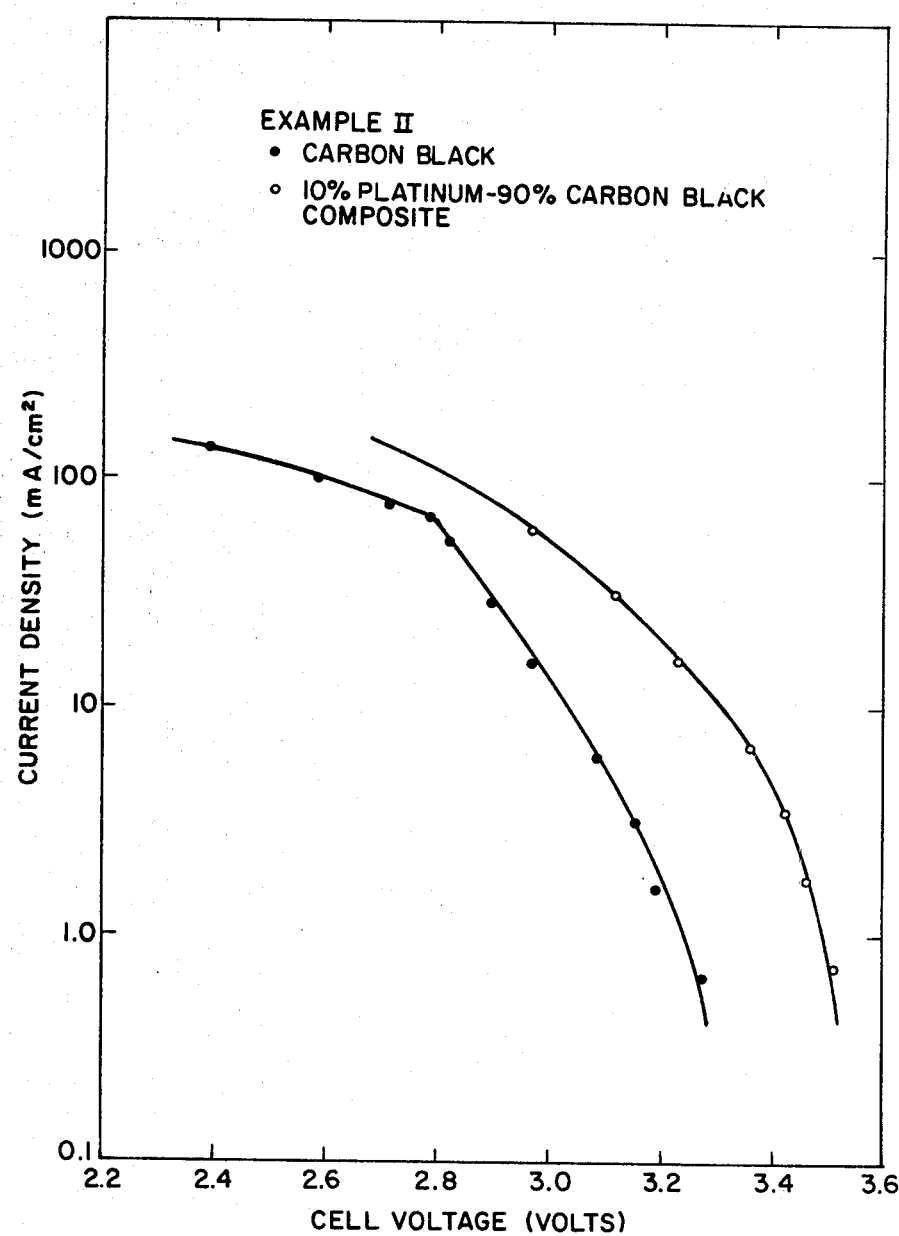
FIG. 5 is a graph showing the curves of cell voltage versus current density for cells prepared according to Example II.
Figure 6:
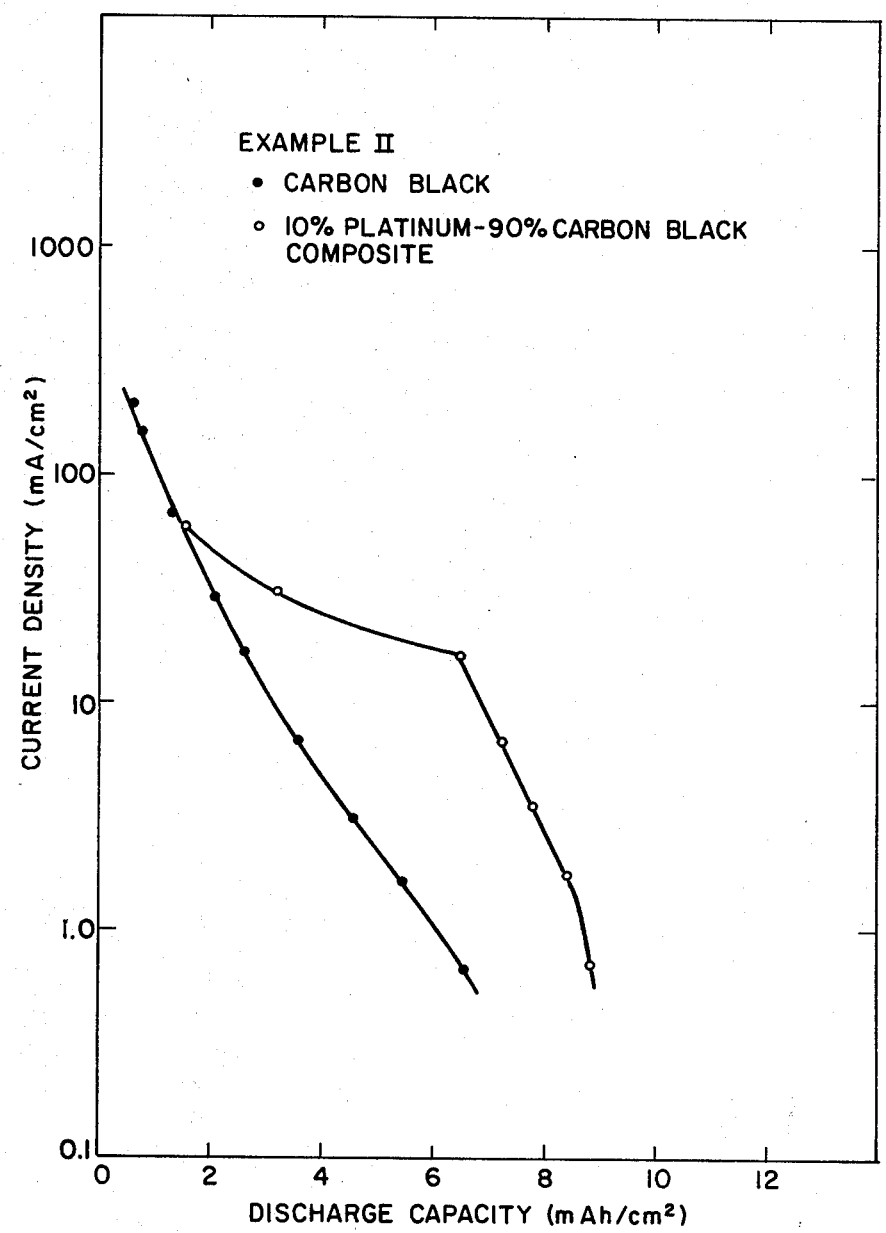
FIG. 6 is a graph showing the curves of discharge capacity versus current density for cells prepared according to Example II.

Another group of cells employing carbon black-platinum composite catalyst layers containing 10% by weight platinum and 90% carbon black were fabricated as above and compared with similar cells employing layers of carbon black. The average diameter of the supported platinum crystallites was less than 30 Å. The cells were discharged across a series of constant loads and the discharge curves were analyzed as above. FIG. 5 shows curves of average cell voltage versus the logarithm of the average current density. FIG. 6 shows curves of discharge capacity versus the logarithm of the average current density. The results obtained are essentially similar to those obtained from the cells of Example I.

EXAMPLE III

Figure 7:
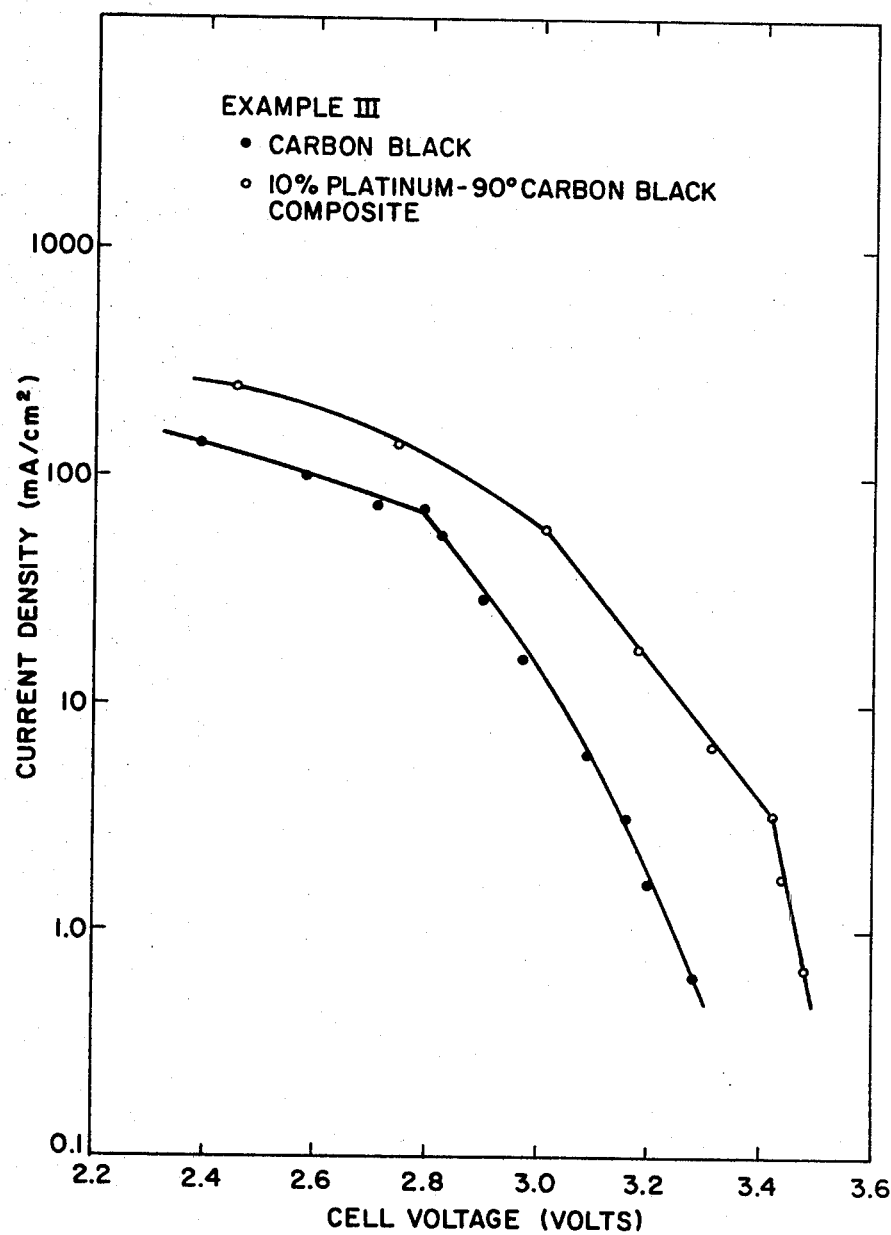
FIG. 7 is a graph showing the curves of cell voltage versus current density for cells prepared according to Example III.
Figure 8:
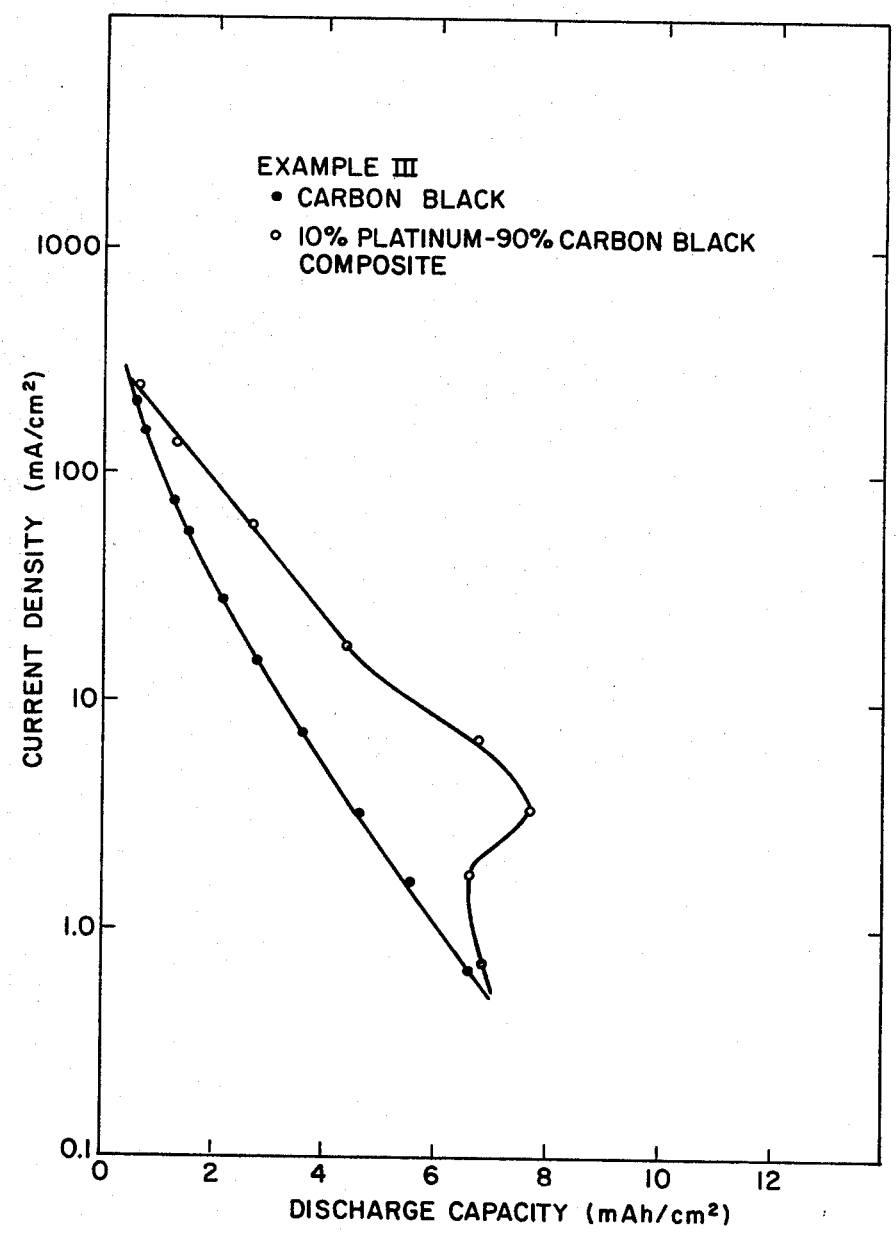
FIG. 8 is a graph showing the curves of discharge capacity versus current density for cells prepared according to Example III.

A group of cells having catalyst layers of carbon black-platinum composite containing 10% by weight platinum and 90% carbon black in accordance with the present invention were fabricated as above. The average diameter of the supported platinum crystallites was about 60 Å. These cells together with similar cells employing layers of carbon black were discharged across a series of constant loads and the discharge curves were analyzed as above. FIG. 7 is a graph of average cell voltage versus the logarithm of the average current density, and FIG. 8 is a graph of the discharge capacity versus the logarithm of the average current density of this group of cells. The results are similar to those obtained for the cells of Example I and Example II.

EXAMPLE IV

Figure 9:
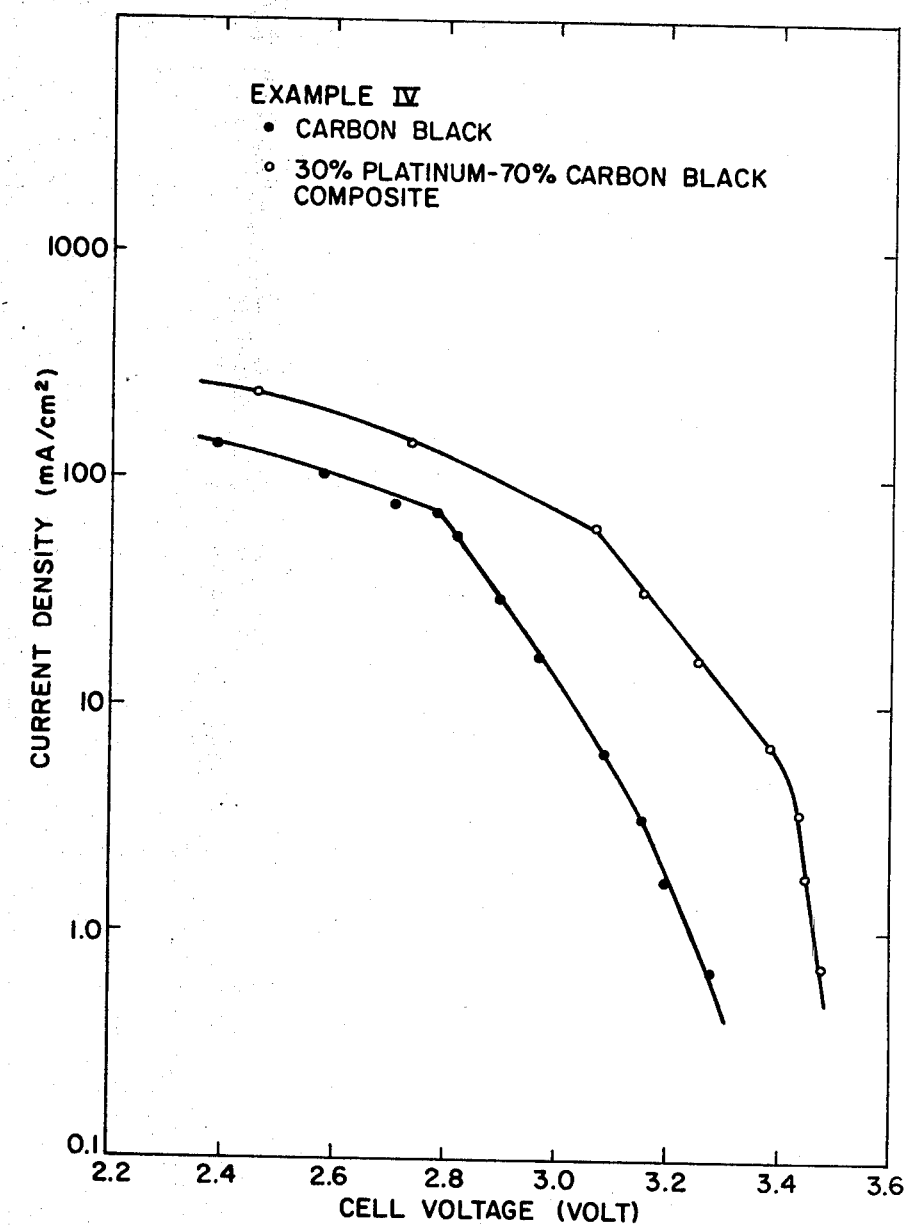
FIG. 9 is a graph showing the curves of cell voltage versus current density for cells prepared according to Example IV.
Figure 10:
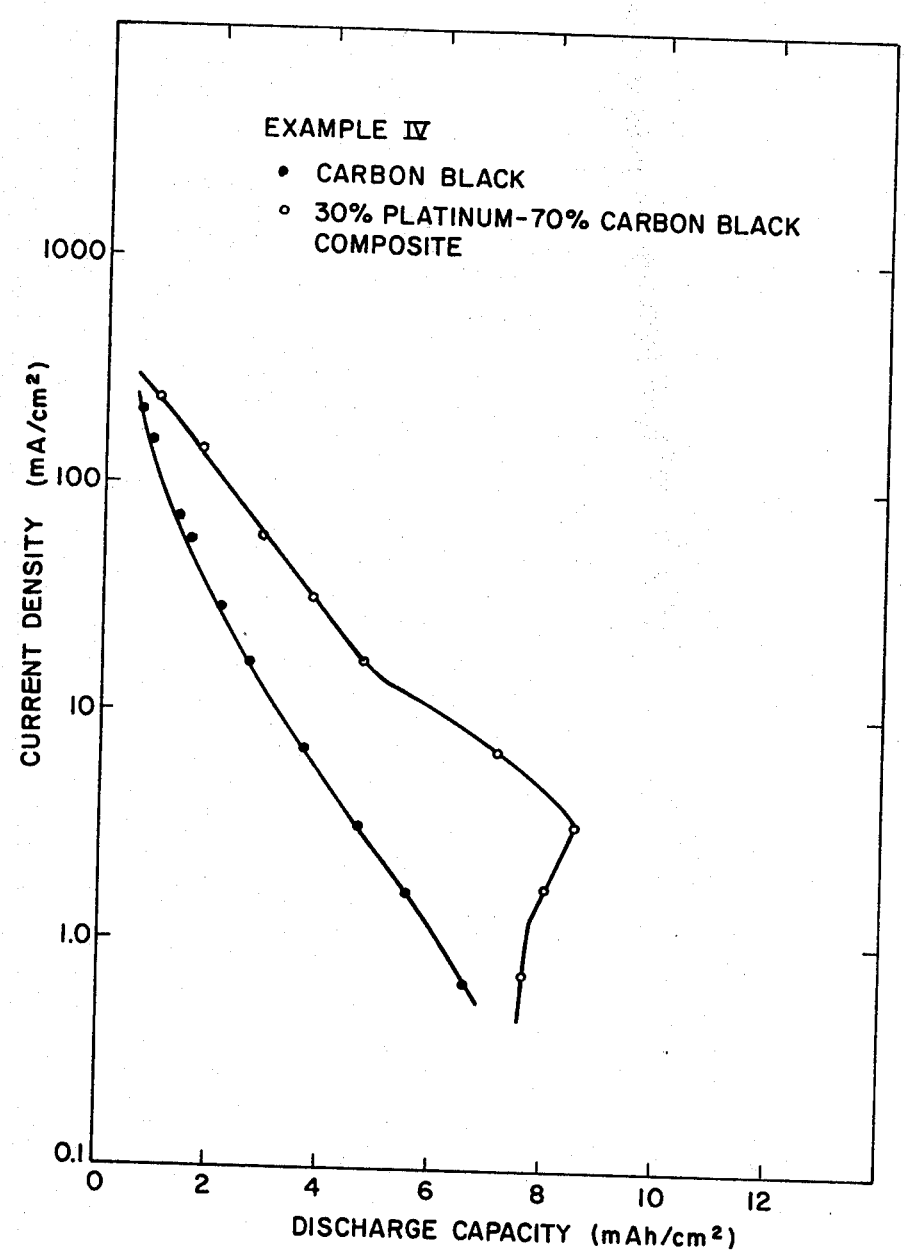
FIG. 10 is a graph showing the curves of discharge capacity versus current density for cells prepared according to Example IV.

In another group of cells employing carbon black-platinum composite material as the catalyst layer, the composite contained 30% by weight platinum and 70% by weight carbon black. The average diameter of the supported platinum crystallites was about 60 Å. The cells were compared with similar cells employing carbon black as the layer by discharging across a series of constant loads and analyzing the resulting discharge curves as above. FIG. 9 is a graph of average cell voltage versus the logarithm of the average current density. FIG. 10 is a graph of the discharge capacity versus the logarithm of the average current density. The results are generally similar to those in the previous examples showing the improved results obtained with the cells employing the carbon black-platinum composite material as the active catalyst layer as against cells employing carbon black as the layer.

Thus, cells containing cathode current collectors employing a composite of carbon and platinum as the active catalyst layer show superior performance characteristics over cells employing carbon black as the active material. In addition, the amount of platinum required and consequently the cost of cells employing a composite of carbon and platinum is much less than with cells having catalyst layers containing only platinum.

While there has been shown and described what are considered preferred embodiments of the present invention, it will be obvious to those skilled in the art that various changes and modifications may be made therein without departing from the invention as defined by the appended claims.

What is claimed is:
1. A primary electrochemical cell comprising:
   an oxidizable active anode material;
   a cathode current collector including a catalyst for reducing the liquid cathode material comprising a composite material of carbon and platinum bonded to an inert, electrically-conductive substrate; and
   an electrolytic solution, in contact with the anode material and cathode current collector, comprising a reducible liquid cathode material and an electrolyte solute dissolved therein.

2. A primary electrochemical cell in accordance with claim 1 wherein
the composite material of carbon and platinum comprises platinum supported on carbon particles.

3. A primary electrochemical cell in accordance with claim 2 wherein
the composite material of carbon and platinum comprises a layer of an aggregate of carbon black particles with platinum particles supported thereon.

4. A primary electrochemical cell in accordance with claim 3 wherein
the composite material of carbon and platinum contains from 5 to 30% platinum by weight.

5. A primary electrochemical cell in accordance with claim 3 wherein
the composite material of carbon and platinum also contains a thermoplastic polymer.

6. A primary electrochemical cell in accordance with claim 5 wherein
the thermoplastic polymer is polytetrafluoroethylene.

7. A primary electrochemical cell in accordance with claim 6 wherein
the composite material contains about 10% polytetrafluoroethylene by weight.

8. A primary electrochemical cell in accordance with claim 3 wherein
the catalyst layer is bonded to the inert, electrically-conductive substrate by a porous intermediate bonding layer comprising a thermoplastic polymer and carbon.

9. A primary electrochemical cell in accordance with claim 8 wherein
the inert, electrically-conductive substrate of the cathode current collector is a thin metal foil.

10. A primary electrochemical cell in accordance with claim 9 wherein
the oxidizable anode material comprises lithium metal; and
the reducible liquid cathode material comprises thionyl chloride.

11. A primary electrochemical cell in accordance with claim 10 wherein
the composite material of carbon and platinum contains about 10% platinum by weight.

* * * * *